United States Patent
Evrard et al.

(10) Patent No.: US 9,822,911 B2
(45) Date of Patent: Nov. 21, 2017

(54) METHOD FOR REPLACING AN OUTER ANNULAR RING OF A FLUID SWIVEL AND A FLUID SWIVEL

(75) Inventors: Cyril Evrard, Levens (FR); Christian Randrianarivony, Eze Bord de Mer (FR)

(73) Assignee: Single Buoy Moorings Inc., Marly (CH)

(*) Notice: Subject to any disclaimer, the term of this patent is extended or adjusted under 35 U.S.C. 154(b) by 694 days.

(21) Appl. No.: 13/703,419

(22) PCT Filed: May 24, 2011

(86) PCT No.: PCT/EP2011/058426
§ 371 (c)(1),
(2), (4) Date: Dec. 11, 2012

(87) PCT Pub. No.: WO2012/004047
PCT Pub. Date: Jan. 12, 2012

(65) Prior Publication Data
US 2013/0088008 A1    Apr. 11, 2013

(30) Foreign Application Priority Data
Jul. 7, 2010 (EP) .................................... 10168794

(51) Int. Cl.
*F16L 27/08* (2006.01)
*F16L 27/087* (2006.01)
(Continued)

(52) U.S. Cl.
CPC .............. *F16L 27/08* (2013.01); *F16L 27/087* (2013.01); *B63B 21/507* (2013.01); *B63B 22/026* (2013.01); *Y10T 137/0402* (2015.04)

(58) Field of Classification Search
CPC ...... F16L 39/06; F16L 27/087; B63B 22/026; B63B 22/507; Y10T 137/0402
(Continued)

(56) References Cited

U.S. PATENT DOCUMENTS 3,923,125 A  *  12/1975  Rosenthal .......................... 184/6
4,126,336 A       11/1978  Ortloff et al.
(Continued)

FOREIGN PATENT DOCUMENTS

| GB | 2336417 A | 10/1999 |
|----|-----------|---------|
| WO | WO-9831963 A1 | 7/1998 |
| WO | WO-01/31164 A1 | 5/2001 |

OTHER PUBLICATIONS

Weber, Ingo, "International Search Report" for PCT/EP2011/058426, dated Jun. 30, 2011, 5 pages.

*Primary Examiner* — Gregory Binda
*Assistant Examiner* — Zachary Dragicevich
(74) *Attorney, Agent, or Firm* — Winstead PC

(57) ABSTRACT

A method for replacing an outer annular ring of a fluid swivel includes a swivel comprising an inner annular ring and an outer annular ring, the rings being located with their adjacent cylindrical surfaces in close proximity for defining a chamber, for receiving a fluid, between peripheral opposing faces of the inner annular ring and the outer annular ring, wherein the inner annular ring is adapted to be connected to an end of a fluid line and wherein the outer annular ring is adapted to be connected to a product piping on the vessel, wherein the method comprises the steps of: removing the outer annular ring, replacing the outer annular ring by means of a first semi-circular element and a second semi-circular element, and fixing the first semi-circular element to the second semi-circular element, by means of a fixing means, to form a replacement outer annular ring of the swivel.

11 Claims, 3 Drawing Sheets

(51) Int. Cl.
*B63B 21/50* (2006.01)
*B63B 22/02* (2006.01)

(58) Field of Classification Search
USPC ....... 285/121.6, 272, 288.1, 121.3, 419, 420
See application file for complete search history.

(56) References Cited

U.S. PATENT DOCUMENTS

| | | | |
|---|---|---|---|
| 4,662,657 A * | 5/1987 | Harvey et al. ................... | 285/96 |
| 6,312,025 B1 * | 11/2001 | Wolfsdorf ............... | F16L 17/02 |
| | | | 285/104 |
| 6,354,633 B1 * | 3/2002 | Carrasco .................... | 285/121.3 |
| 2002/0043800 A1 * | 4/2002 | Montgomery et al. ......... | 285/95 |

\* cited by examiner

METHOD FOR REPLACING AN OUTER ANNULAR RING OF A FLUID SWIVEL AND A FLUID SWIVEL

FIELD OF THE INVENTION

The invention relates to a method for replacing an outer annular ring of a fluid swivel, wherein the fluid swivel is adapted to allow fluid transfer across a rotary interface between the ends of a fluid line connected to the sea beds and product piping on the vessel of a gas and oil production. The invention relates more specifically to a method for replacing an outer annual ring or a high pressure swivel.

The fluid swivel is used in a structure which allows a vessel for gas and oil production to be connected to a geo-stationary duct for transporting hydrocarbons from the seabed towards the vessel or for injecting fluids, in liquid or gas form, like water into the wells for pressurization purposes or CO2 in depleted wells or gas caverns. The structure allows the vessel to weathervane with respect to this geo-stationary duct while maintaining a fluid-tide connection between the end of the geo-stationary duct and product piping on board.

BACKGROUND OF THE INVENTION

From WO 98/31963 a swivel is known having a toroïdal chamber for receiving hydrocarbons. The toroïdal chamber is enclosed by a stationary inner wall and a rotary outer wall. The stationary inner wall is provided with a first guide for supplying hydrocarbons from a fluid line connected to the seabed towards the toroïdal chamber. The rotary outer wall is provided with a further guide to allow the hydrocarbons to be forwarded towards product piping on board of a vessel.

In order to define the toroïdal chamber between the two walls, the inner wall and the outer wall are located with their adjacent cylindrical surfaces in close proximity, whereby a relatively small upper annular gap and a lower annular gap are formed between the adjacent cylindrical surfaces of the walls on either side of the toroïdal chamber. In the art the gaps are also known as 'seal extrusion gaps'.

In order to avoid any leaking, these gaps are sealed by means of sealing elements. These sealing elements normally comprise elastically deformable sealing rings which are of U-shaped or V-shaped form.

The sealing of swivels handling liquids or crude oils with limited gas content can also be achieved with a double sealing arrangement on either side of the toroïdal chamber. The first or primary seals are positioned closest to the toroïdal chamber and carry full pressure. The second or secondary seals are positioned at a distant of the first or primary seals and function to provide back-up in the event the first or primary seal should rupture.

In the known swivels the gaps are designed to have a minimal opening. However, a minimal gap width must be maintained such that possible deflections of the inner and the outer walls of the swivel will not cause the two elements to contact one another and thus prevent relative rotation of the two swivel elements.

Normally the swivel, according to the type above, will be part of a swivel stack positioned in a turret. The subsea hydrocarbons structures, such as oil or gas wells, are connected to a floating production, storage and offload vessel (FPSO) via one or more risers extending from the bottom of the sea to the vessel. By means of the swivels, the risers are each connected to a piping structure on a turret around which the production vessel can weathervane to adjust its position according to current directions and prevailing wind. The geo-stationary part of each product riser is connected to a stationary inner ring of a respective swivel in the swivel stack. Production piping for distributing the hydrocarbons to the weathervaning part of the vessel are connected to the outer annual ring of each swivel which can rotate with the weathervaning vessel around the fixed positioned inner ring of the swivel.

In order to minimize the possible deformations of the inner and the outer wall due to pressure effects, the known swivel walls are made of cast steel with a wall thickness up to 240 mm for a swivel with a diameter of 2 m. Deformations are so prevented by the heavy masses of the inner and outer wall. The effect of these measures is that a swivel with a 2 m diameter may weigh 20 tons or more.

When designing a swivel, not only the deformations of the inner and the outer wall should be minimized, the design should also ensure that the stresses remain within the limits imposed by the Pressure Vessel Codes.

In use the swivels and specially the outer part of the swivels are exposed to heavy load and important temperature changes.

Hydrocarbons supplied to the swivels often have temperatures in the order of 20 to 120° C. During the transfer of the fluids the outer wall will be cooled off by the external ambient air, especially when the swivel is exposed to outside weather conditions and when the wind directly blows against the exterior of the swivel. Contrary to the outer wall, the inner wall will remain relatively hot.

The temperature difference between the inner wall and the outer wall can also be important when the fluid transferred via the swivel is very cold; this is the case for swivels allowing the transfer of liquefied gases such as LPG, LNG, $CO_2$ and any other cold or cryogenic fluids.

Generally, the swivels are exposed to high pressure. For the purpose of the present invention the word high pressure is intended to include pressures of 50 by and higher. The pressure in the toroïdal chamber of the swivel can easily exceed pressures of 200 bar.

Because of the extreme conditions under which the swivels are used, it is possible that during the lifetime of the swivel the outer annular ring presents defects and must be replaced. Because of the fact that each swivel is part of a swivel stack, which is positioned in a turret, the removal and replacement of an outer annular ring in a swivel is extremely complicated. Because of the presence of adjacent swivels there is very little room to move the outer annular ring of a swivel either upwardly or downwardly. In order to replace the outer annular ring of a swivel, the swivel has to be removed from the swivel stack completely. Once the outer annular ring has been replaced, the swivel can be positioned in the swivel stack and be used for its normal function.

According to the prior art, the replacement of an outer annular ring in a swivel stack is either done by using a barge next to the turret, which barge is provided with lifting means in order to remove the different parts of the swivel stack in order to create enough accessibility to replace the outer annual ring which has reached the end of its lifetime. Alternatively, the vessel should be completely cut loose from the production lines and should be sailed to a workshop, for instance on shore, in order to do the replacement of the swivel part on shore.

In practice, the removal of the swivel stack and replacement of an outer annular ring of a swivel can take several months. In the offshore technology, the downtime of any system is extremely costly. Because of the costs of intensive equipment that is used and the costs of personnel any downtime should be limited to the absolute minimum.

In order to avoid at least some of the problems described above, related to the replacement of a swivel part, the object of the present invention is to provide a method for replacing an outer annular ring of a swivel, which method is both time and cost efficient.

SUMMARY OF THE INVENTION

The invention relates to a method for replacing an outer annular ring of a fluid swivel, the fluid swivel being adapted to allow fluid transfer across a rotary interface between the end of a fluid line connected to the seabed and product piping on a vessel for gas and oil production, wherein the swivel comprises an inner annular ring and an outer annular ring, the rings being located with their adjacent cylindrical surfaces in close proximity for defining a chamber, for receiving a fluid, between the peripheral opposing faces of the inner annular ring and the outer annular ring, wherein the inner annular ring is adapted to be connected to the end of the fluid line and wherein the outer annular ring is adapted to be connected to the product piping on the vessel, wherein the method comprises the steps of:

removing the outer annular ring,
replacing the outer annular ring by means of at least two circular segments for together forming a ring, and
fixing the at least two circular segments to each other by means of a fixing means, to form the replacement outer annular ring of the swivel.

In the present text, the wording "inner annular ring" is used. This word makes reference to the inner part of the swivel. It can refer to the inner core of a swivel which is hence not a ring as such but a cylinder comprising several fluid paths.

According to the present invention, an existing outer annular ring is not replaced by a new outer annular ring of the same size and dimension, but is replaced by an outer annular ring which comprises at least a first and a second circular segments.

In the present text, the wording "circular segment" is used. This word makes reference to an element which is basically part of a ring. The basic idea of the invention is to replace the single, solid, outer annular ring by circular segments which once fixed together, form a replacement outer annular ring. In case two circular segments are used, those circular segments will have the form of semi-circular elements. In case three circular segments are used, each circular segment will, for instance, provide $33^{1/3}$ percent of the final outer annular ring, etc. The effect of replacing one outer annular ring by multiple circular segments is that the original outer annular ring can be removed in situ and, once the original outer annular ring has been removed, the segments forming the replacement annular ring can be put into place.

According to the present invention, the at least two circular segments are connected by a means of fixing means such as a series of bolts.

According to a preferred embodiment of the invention, the fixing means are used to fix a first and a second segment against each other. Thereafter, a welding line is formed at the contact line at the inner annular surface between this first and this second circular segments. This metal-to-metal contact requires a particular shape of the external elements with hollow parts to give a spring effect to surfaces of contact. This permanent contact is considered as a first seal barrier.

According to the present invention there is a second seal barrier which is formed by the welding line.

Once this welding line is present, the force with which the first and the second segments are forced onto each other is increased. The effect of this measure is that a welding line is created which primary function is the creation of an additional seal.

Because of the high pressures which are used in the swivel and to which the replacement outer annular ring will be exposed, the circular segment can not be suitably connected by using a welding line only. The first and the second circular segments will be fixed together by using the fixing means, such as the bolts. Because of the high pressures and the size of the first and the second circular segments it is likely that at least in the part of the contact area between these segments, which is exposed to the high fluid pressure, a small opening or crack will be present. The presence of the weld line is important, not so much to keep the first and the second segments connected but to ensure that the two segments at their contact area are completely sealed off in order to avoid liquid entering in the space between the first and second segments. It is therefore important to have a continuous welding.

Once the weld is created, the tension on both segments is increased in order to ensure that the weld is always in compression, also when the pressure inside the toroïdal chamber increases and urges the circular segments apart.

According to a second aspect of the invention, the invention relates to a fluid swivel for allowing fluid transfer across a rotary interface between the end of a fluid line connected to the seabed and product piping on a vessel for gas and oil production, wherein the swivel comprises an inner annular ring and an outer annular ring, the rings being located with their adjacent cylindrical surfaces in close proximity for defining a chamber, for receiving a fluid, between the peripheral opposing faces of the inner annular ring and the outer annular ring, wherein the inner annular ring is adapted to be connected to the end of the fluid line, which extends through the inner ring towards the chamber in order to allow fluid supply towards or from the chamber and wherein the outer annular ring is adapted to be connected to the product piping and is provided with a duct to allow the fluid to flow from or to the chamber towards the product piping, characterised in that, the outer annular ring comprises at least a first circular segment and a second circular segment, wherein the segments together form a ring and fixing means for fixing the at least two circular segments to form the outer annular ring of the swivel.

According to a preferred embodiment of the invention, the fixing means comprise at least a first bolt to fix a first and a second circular segments together at a first contact surface.

According to a preferred embodiment of the invention, the first and the second circular segments are connected by means of a weld line positioned at the inner annular surface between the first and second circular segments.

According to a preferred embodiment, the outer annular ring comprises super duplex stainless steel.

The present invention also relates to an outer annular ring adapted for the swivel according to the invention.

According to a further aspect of the invention, the invention relates to a turret structure for allowing a vessel for gas and oil production to be connected to the end of a geo-stationary fluid duct and for allowing product piping on the vessel to be connected to the end of said geo-stationary duct via a rotary interface, wherein the turret structure comprises the swivel according to the invention.

According to a further aspect of the invention, the invention relates to a vessel comprising the turret structure according to the invention.

SHORT DESCRIPTION OF THE DRAWINGS

The invention will be explained in detail with reference being made to the drawings, wherein.

Figure 5:
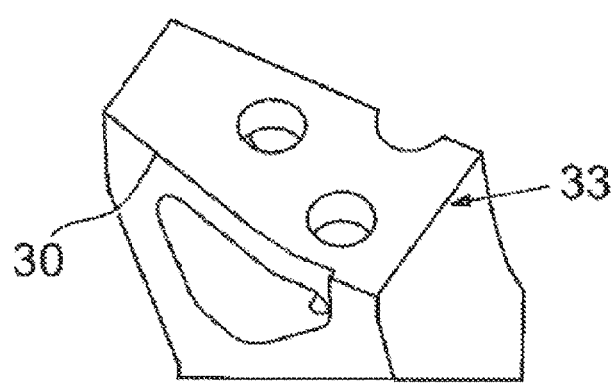

And FIG. 5 shows a detail of the weld line area in order to connect a first semicircular element to a second semicircular element by means of a weld.

Figure 1:
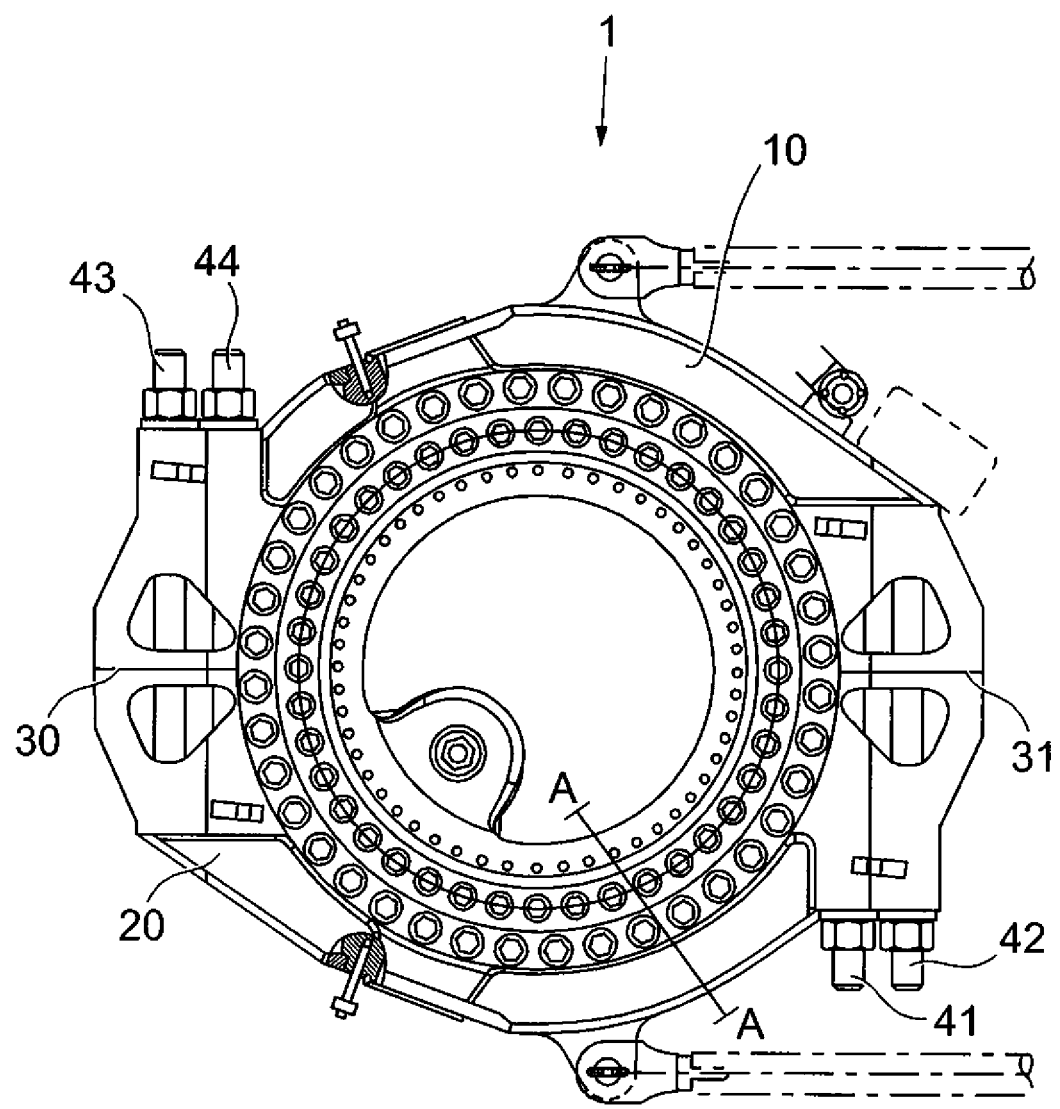
FIG. 1 shows a swivel comprising the replacement outer annular ring according to the invention.

FIG. 1 shows a possible embodiment of a swivel 1 according to the present invention, wherein the replacement outer annular ring comprises a first and a second semi-circular elements. It will be understood that the replacement outer annular ring could also comprise three or more circular segments, adapted to form the outer annular ring. These other embodiments are not shown in the accompanying drawings.

The swivel 1 is adapted to provide a rotary fluid connection between a geo-stationary duct and product piping on a vessel for production, storage and offloading of hydrocarbons.

The functioning of the swivel is similar to existing swivels and will briefly be discussed with reference to FIG. 2.

The swivel according to FIG. 1 comprises an outer annular ring in order to define a fluid chamber in the interior of the swivel, which outer annular ring comprises a first semi-cylindrical element 10 and a second semi-cylindrical element 20. The two elements 10 and 20 are not identical but are essentially the same in their design and functioning. The semi-circular elements 10 and 20 are provided at their interior with a wall for defining the fluid chamber inside the swivel 1 (see FIG. 2) in order to be able to withstand the high pressure within this fluid chamber the elements 10 and 20 are relatively heavy and of rigid construction. In order to avoid excessive weight, the elements 10 and 20 have an interior box like construction in order to gain weight without losing the rigidity of the elements 10 and 20 (see FIG. 2). Both semi-circular elements 10 and 20 have two end faces with which they contact the other semi-circular element, the contact areas are schematically indicated with lines 30 and 31. In order to be able to withstand the high pressure within the fluid chamber it is important that the two semi-circular elements 10 and 20 are pressed together at the contact area 30 and 31 with sufficient pressure. According to the present invention the two elements 10 and 20 are bolted together by means of studbolts. According to FIG. 1 four studbolts 41, 42, 43 and 44 are shown. By means of the studbolts 41-44 the exact tension between the two elements 10 and 20 at the contact area 30-31 can be determined.

Figure 2:
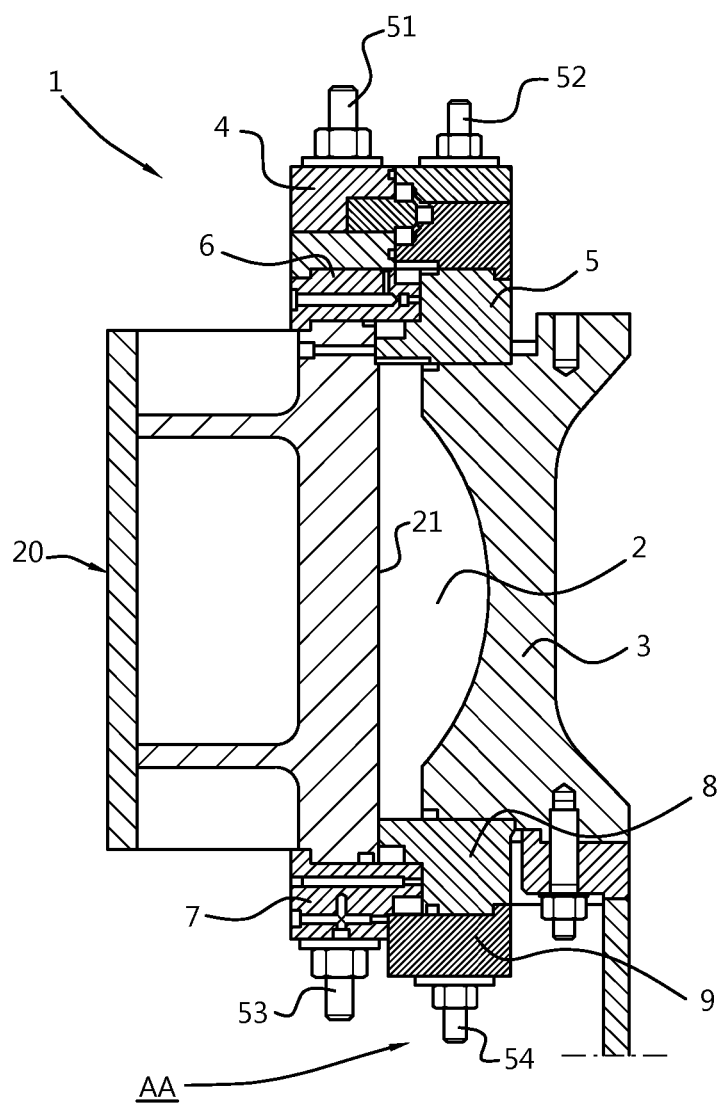
FIG. 2 shows a cross section of the swivel according to FIG. 1.

In FIG. 2 a cross section is shown according to the line A-A of element 20 of the swivel 1 according to FIG. 1.

The cross section of element 10 would have been similar. FIG. 2 shows a toroidal chamber 2 which is defined on the interior between peripheral opposing faces of an inner annular ring 3 and the interior wall 21 of the semi-circular element 20. The inner annular ring 3 is the part of the swivel 1 which is adapted to be connected to a geo-stationery duct. The outer annular ring comprising the elements 10 and 20 can rotate with respect to the inner annular ring 3 because of the presence of a roller bearing 4. The swivel 1 further comprises a top inner ring 5, a top outer ring 6, a bottom outer ring 7 and two bottom rings 8 and 9, wherein the rings 3, 4, 5, 6, 7, 8 and 9 in combination with the roller bearing 4 are all bolted together using bolts 51, 52, 53 and 54. Other elements as shown in FIG. 2 are standard elements of a swivel which will not be described in detail below.

As shown in FIG. 2 the semi-circular element 20 has a box shaped construction and that part of the interior volume of the semi-circular element 20 is empty in order to save weight. Regarding the size of the semi-circular element 20 and the material used, the semi-circular elements 10 and 20 have a tendency to become relatively heavy.

In FIG. 2 it is shown that with the construction of the swivel as shown in FIG. 2 it is possible to release for instance the bolts 53 and 54 in order to remove at least part of the rings 7, 8 and 9 in order to make space to move the semi-circular element 20 in a vertical direction. This movement in a vertical direction is necessary to allow the semi-circular elements 10 and 20 to be welded together as will be described with reference to FIGS. 4 and 5.

Figure 3:
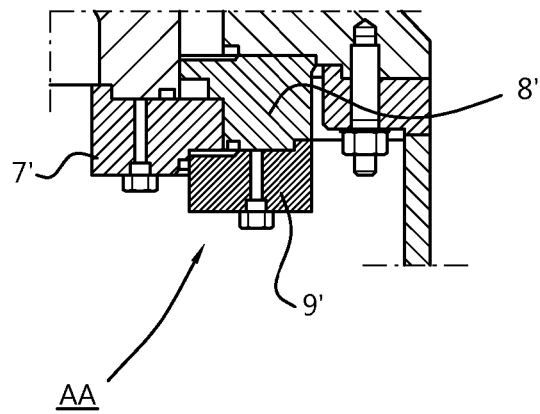
FIG. 3 shows an alternative embodiment of the bottom part of the swivel according to FIGS. 1 and 2.
Figure 4:
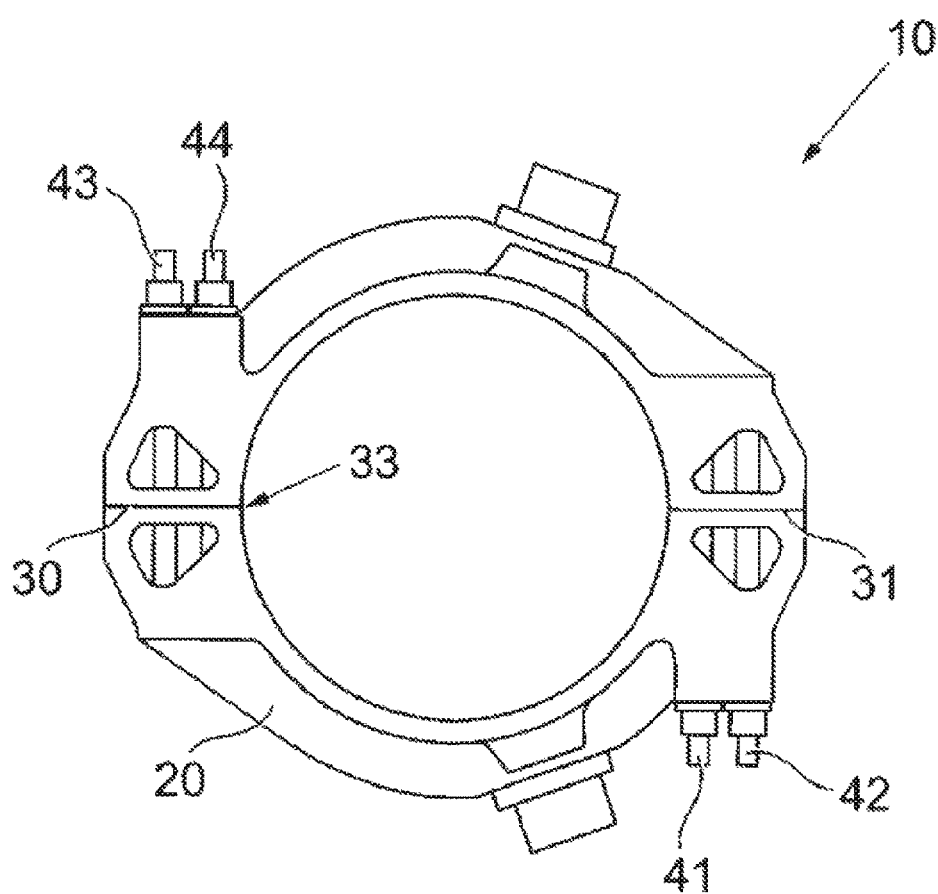
FIG. 4 shows the outer annular ring for the swivel according to the present invention.

In FIG. 3, an alternative embodiment is shown of the swivel 1 according to FIG. 2 wherein the form of the bottom rings 7 and 9 is amended. In FIG. 4 only the two semi-circular elements 10 and 20 are shown with the respective bolts 41, 42, 43 and 44. FIG. 4 shows the full length of the contact areas 30 and 31 that means the contact surfaces wherein the semi-circular elements 10 and 20 are in contact with each other. In practice, it will be very difficult to produce semi-circular elements 10 and 20 which, once connected to each other using the bolts 41-44, will have a contact area on the inner peripheral surface which is perfect in the sense that not a single micro opening will exist between the two semi-circular elements 10, 20 when pressed together. To make sure that the two semi-circular elements 10 and 20 are correctly connected to each other, according to the invention the semi-circular elements 10 and 20 will, in a first instance, be connected together by using the bolts 41-44. In this first instance, the bolts will only be tightened in order to keep the semi-circular elements 10 and 20 correctly positioned one with respect to the other. That means for instance that the bolts 41-44 are pre-tensioned at the level for instance of 5-30% of their maximum pre-tension. Once the two semi-circular elements 10, 20 are connected together with this limited pre-tension, they are moved eccentric to the axis of the inner annular ring to create the space required for welding. It is then possible to produce a continuous weld line over the contact line 33 which is shown in FIG. 5. The direction of the weld line 33 is perpendicular to the direction of the contact line 30 which is also visible in FIG. 5. Similarly, a second continuous weld line will be produced which will be perpendicular to the contact surface 31.

Once the two weld lines are produced the interior surface of the now connected semi-circular elements 10 and 20 will be machined in order to obtain the required surface conditions needed for proper operation of the now combined semi-circular elements 10, 20 as the outer annular ring for the swivel 1 according to FIG. 1.

EXAMPLES

According to an example the semi-circular elements 10, 20 are produced of super duplex stainless steel, for instance super duplex stainless steel Zeron 100. In order to fix the two elements together, carbon steel studbolts 41, 42, 43 and 44 are used, for instance class B24 studbolts.

When positioning the first and second semi-circular elements in place in order to form a new outer annular ring for a swivel 1, in a first instance the studbolts 41-44 are used to fix the semi-circular elements 10,20 together having the studbolts pre-tensioned to 5-30% of their final pre-tension level. Preferably, this pre-tension is set to 25% of their final pre-tension level.

Once the first and second semi-circular elements have been fixed together as described above, the weld connections between the internal phases of the first and second semi-circular elements are added.

Thereafter, the pre-tension on the studbolts 41-44 is increased to their final pre-tension level. By increasing the tension on the bolts the weld will be put under compression.

The now combined semi-circular elements 10, 20 are ready to operate as the new outer annular ring of the swivel.

The invention claimed is:

1. A fluid swivel for allowing fluid transfer across a rotary interface between an end of a fluid line connected to a seabed and product piping on a vessel for gas and oil production, wherein the fluid swivel comprises:
   an inner annular ring;
   an outer annular ring;
   the inner annular ring and the outer annular ring being located with their adjacent cylindrical surfaces in close proximity for defining a toroidal-shaped chamber, for receiving a fluid, between peripheral opposing faces of the inner annular ring and the outer annular ring;
   wherein the inner annular ring is adapted to be connected to the end of the fluid line, which extends through the inner ring towards the toroidal-shaped chamber in order to allow fluid supply towards or from the toroidal-shaped chamber;
   wherein the outer annular ring is adapted to be connected to the product piping and is provided with a duct to allow the fluid to flow from or to the toroidal-shaped chamber towards the product piping;
   wherein the outer annular ring comprises at least a first circular segment and a second circular segment, wherein the first circular segment and the second circular segment together form a ring, and a fixing means for fixing the first circular segment and the second circular segment to form the outer annular ring of the fluid swivel;
   wherein the first and the second circular segments are connected via a weld line positioned at an inner annular surface between the first and second circular segments; and
   wherein a tension is applied to the first and second circular segments by the fixing means, such that the weld line is always under compression.

2. The fluid swivel according to claim 1, wherein there are two different seal barriers between the first circular segment and the second circular segment consisting of a permanent metal-to-metal contact and a continuous welding at the inner annular surface between the first circular segment and the second circular segment.

3. The fluid swivel according to claim 1, wherein the fixing means comprise at least a first bolt to fix the first circular segment and the second circular segment together at a first contact surface.

4. The fluid swivel according to claim 1, wherein the outer annular ring comprises a first semi-circular element and a second semi-circular element.

5. The fluid swivel according to claim 1, wherein the outer annular ring comprises super duplex stainless steel.

6. A turret structure for allowing a vessel for gas and oil production to be connected to an end of a geo-stationary fluid duct and for allowing product piping on the vessel to be connected to the end of said geo-stationary fluid duct via a rotary interface, wherein the turret structure comprises the fluid swivel according to claim 1.

7. A vessel comprising the turret structure according to claim 6.

8. A method for replacing the outer annular ring of the fluid swivel according to claim 1, the method comprising:
   removing the outer annular ring;
   replacing the outer annular ring with the at least a first circular segment and a second circular segment; and
   fixing the at least a first circular segment and a second circular segment to each other via a fixing means, to form a replacement outer annular ring of the fluid swivel.

9. The method according to claim 8, wherein the method comprises fixing the first circular segment to the second circular segment with at least a first bolt.

10. The method according to claim 8, wherein the method comprises connecting the inner annular surface between the at least a first circular segment and a second circular segment by forming the weld line.

11. The method according to claim 10, wherein the method comprises increasing, after the connecting, a contact force at a contact surface between the first circular segment and the second circular segment via the fixing means.

* * * * *